UNITED STATES PATENT OFFICE.

GEORGE JAQUES, OF SOMERVILLE, AND DANIEL F. WHITE AND JOHN STOWELL, OF CHARLESTOWN, MASSACHUSETTS.

IMPROVED CONCENTRATED FEED FOR HORSES, &c.

Specification forming part of Letters Patent No. 41,301, dated January 19, 1864.

*To all whom it may concern:*

Be it known that we, GEORGE JAQUES, of Somerville, and DANIEL F. WHITE and JOHN STOWELL, of Charlestown, Middlesex county, State of Massachusetts, have invented a new and useful concentrated feed for animals, but more particularly to be used for horses and mules in military service; and we do hereby declare that the following is a true and exact description thereof, and of the manner of compounding and using the same.

The object of our invention is to provide food for animals in military service, which, while containing all the nutritive elements common to the ordinary food eaten by them, shall at the same time only occupy but a small portion of the space ordinarily occupied by the usual food of such animals. We thus obviate the necessity of heavy transportation-trains for animal supplies; and in case of a contemplated "raid" by cavalry the requisite subsistence for the horses can be transported by the animals upon which the cavalrymen are mounted. To this end we take cereal grains, leguminous seeds or maize, and deprive them, as far as possible, of all unnutritious substances by the well-known chemical and mechanical means. We then subject them to heat in order to expel the moisture, and grind them to a tolerably fine condition—say as fine as the ordinary fine hominy is ground. The requisite heat may, however, be applied after the substances are properly ground. To the substances so comminuted we add a quantity of salt, and in some cases a quantity of phosphate of lime and magnesia, and also a quantity of molasses or gum in solution. Having thoroughly incorporated the molasses or other saccharine substance or gum with the substances prepared as stated, we then put them into a suitable mold and subject them to a pressure sufficient to cause the particles of matter to adhere in a solid concrete mass. Hydraulic pressure for this purpose may be employed, and the substances may thus be reduced to a very small compass as compared to that originally occupied by them. When so compressed the mass or "block" or "cake" of food may have an outside covering applied of any suitable fibrous material which has been made impervious to water by any of the well known means; or the cake itself may have the impervious material applied directly to it, for which purpose collodion may be used, or any of the light varnishes.

In the choice of grain or seeds for the composition of our food regard is had for those containing the greatest quantity of nitrogenized elements or proteine compounds; and we do not confine ourselves to the vegetable proteine compounds, but apply and add to the vegetable the animal proteine compounds after having subjected them to sufficient heat to enable us to grind them into powder.

Having thus in general terms specified our mode of preparing the substances used and manner of treating same, we will now specify the particular substances employed, together with their due relative proportions—to wit: For a quantity weighing twenty-seven pounds, we take of beans, ten pounds; potato-starch, four pounds; hay-seed, eight ounces; oatmeal, ten pounds; salt, two ounces; molasses or other saccharine, two pounds six ounces; burned bones, one hundred and fifty-seven grains. The proportions as above named are those preferred by us, and in said compound it will be observed that those articles bearing the greatest relative proportion to the balance named furnish the greatest proportion of elements which go to make blood, muscle, and fat for the animals, while the starch is added to produce fat, as well as making the compound attractive. The burned bone affords the proper supply of carbon and phosphate, and the hay-seed, aside from its other qualities, imparts a fragrance to the mass. The molasses employed serves the purpose of causing the mass to adhere, and at the same time regulates the bowels of the animal, besides being attractive to the taste.

If deemed proper, cut hay may be added to the mass; but this we do not deem essential where the compound is to be used simply for cavalry excursions which occupy but a week or ten days'-time. When the compound is to be used for regular feed a portion of cut hay may be added.

While the aforegoing ingredients, and in their proportions named, constitute our concentrated food for animals, still we wish it to be understood that we do not mean to confine ourselves to the exact proportions specified, as such proportions might be changed and still embody our invention.

In the manufacture of the concentrated food above described cakes weighing five pounds, or thereabout, may be formed, one of which will be sufficient food for a horse for twenty-four hours, as each cake will contain as much nourishment as the quantity of ordinary food consumed by such animal within that time.

Having thus described our invention, what we claim as new, and desire to secure by Letters Patent, is—

1. Preparing a concentrated nutritive food for animals in the manner substantially as set forth.

2. As a new manufacture, a package for feeding animals, composed of nutritive material, such as herein described, compressed and inclosed in a water and air tight covering, substantially as set forth and described.

Witness our hands in matter of our application for a patent for improved concentrated feed for animals.

GEORGE JAQUES.
DANL. F. WHITE.
JOHN STOWELL.

Witnesses to signatures of George Jaques and Danl. F. White:
R. T. CAMPBELL,
E. SCHAFER.

Witnesses to signature of John Stowell:
JOHN Q. A. GRIFFIN,
S. E. GRIFFIN.